United States Patent
Wigglesworth et al.

(10) Patent No.: US 11,762,709 B2
(45) Date of Patent: Sep. 19, 2023

(54) PREDICTIVE AUTO-SCALER FOR A HIERARCHICAL COMPUTING INFRASTRUCTURE

(71) Applicant: International Business Machines Corporation, Armonk, NY (US)

(72) Inventors: Joseph Paul Wigglesworth, Thornhill (CA); Yar Rouf, Toronto (CA); Joydeep Mukherjee, Durgapur (IN); Marin Litoiu, Toronto (CA); Radu Bogdan Mateescu, Ontario (CA)

(73) Assignee: International Business Machines Corporation, Armonk, NY (US)

(*) Notice: Subject to any disclaimer, the term of this patent is extended or adjusted under 35 U.S.C. 154(b) by 182 days.

(21) Appl. No.: 17/094,856

(22) Filed: Nov. 11, 2020

(65) Prior Publication Data

US 2022/0147401 A1 May 12, 2022

(51) Int. Cl.
*G06F 9/50* (2006.01)
*H04L 67/10* (2022.01)
*G06N 20/00* (2019.01)

(52) U.S. Cl.
CPC .......... *G06F 9/5083* (2013.01); *G06N 20/00* (2019.01); *H04L 67/10* (2013.01)

(58) Field of Classification Search
None
See application file for complete search history.

(56) References Cited

U.S. PATENT DOCUMENTS

| | | | |
|---|---|---|---|
| 9,547,534 B2 | 1/2017 | Dettori et al. | |
| 2013/0014107 A1* | 1/2013 | Kirchhofer | G06F 9/5083 718/1 |
| 2013/0086273 A1 | 4/2013 | Wray et al. | |

(Continued)

FOREIGN PATENT DOCUMENTS

| | | |
|---|---|---|
| CN | 104040485 A | 9/2014 |
| CN | 106201718 A | 12/2016 |

(Continued)

OTHER PUBLICATIONS

Ahn et al., "Auto-Scaling Method in Hybrid Cloud for Scientific Applications", Proceedings of the 16th Asia-Pacific Network Operations and Management Symposium (APNOMS 2014), Sep. 17-19, 2014, Hsinchu, Taiwan, 4 pages, <https://ieeexplore.ieee.org/document/6996527>.

(Continued)

*Primary Examiner* — June Sison
(74) *Attorney, Agent, or Firm* — Aaron N. Pontikos (57) ABSTRACT

A cloud configuration, including public and private clouds, is organized hierarchically, with a top level and any number of lower levels. A parent level cloud receives resource workload metrics from respective child level cloud(s), makes predictions, based in part on the metrics, as to future resource needs at the child level. The parent level sets up (Continued)

runtime-modifiable business rules and scaling plans based on the predictions. The parent level cloud sends the scaling plans to respective child level(s). The parent level automatically triggers a scaling plan at a child level, if conditions written into the business rules are satisfied. Resources are scaled upward or downward automatically as needed to maintain optimal resource usage.

20 Claims, 7 Drawing Sheets

(56) References Cited

U.S. PATENT DOCUMENTS

| | | | |
|---|---|---|---|
| 2013/0179895 A1 | 7/2013 | Calder | |
| 2015/0113120 A1 | 4/2015 | Jacobson et al. | |
| 2015/0379429 A1* | 12/2015 | Lee | G09B 5/00 |
| | | | 706/11 |
| 2016/0142265 A1* | 5/2016 | Dube | G06F 9/45558 |
| | | | 709/223 |
| 2022/0261661 A1* | 8/2022 | Khaligh | G06Q 10/06314 |

FOREIGN PATENT DOCUMENTS

| | | |
|---|---|---|
| CN | 111491006 A | 8/2020 |
| EP | 3410301 A1 | 12/2018 |
| WO | 2022100438 A1 | 5/2022 |

OTHER PUBLICATIONS

Ajila et al., "Using Machine Learning Algorithms for Cloud Client Prediction Models in a Web VM Resource Provisioning Environment", Transactions on Machine Learning and Artificial Intelligence, vol. 4, Issue 7, Feb. 27, 2016, 24 pages, <http://dx.doi.org/10.14738/tmlai.41.1690>.

Mell et al., "The NIST Definition of Cloud Computing", Recommendations of the National Institute of Standards and Technology, Special Publication 800-145, Sep. 2011, 7 pages.

Nikravesh et al., "Towards an Autonomic Auto-Scaling Prediction System for Cloud Resource Provisioning", Proceedings of the 10th International Symposium of Software Engineering for Adaptive and Self-Managing Systems, May 18-19, 2015, Florence, Italy, 11 pages, <https://ieeexplore.ieee.org/document/7194655>.

International Search Report and Written Opinion, International Application No. PCT/CN2021/126859, International Filing Date Oct. 28, 2021.

* cited by examiner

PREDICTIVE AUTO-SCALER FOR A HIERARCHICAL COMPUTING INFRASTRUCTURE

BACKGROUND

The present invention relates generally to the field of adaptive autonomic computing, and more particularly to resource management with respect to deployment of a hierarchical hybrid computing infrastructure comprising private and/or public computer networking platforms.

In a hybrid computing environment, an enterprise may use public and private computing resources computing resources working in conjunction with one another. For example, the enterprise may store sensitive client data in-house while running certain applications on a public cloud infrastructure. The public cloud infrastructure provides flexibility to as to storage and processing resources, and is able to automatically scale up or scale down allocation of resources in response to workload variations.

SUMMARY

According to an aspect of the present invention, there is a method, computer program product and/or system for automatic resource scaling in a multi-level computing platform that performs the following operations (not necessarily in the following order): (i) receiving a first workload metric with respect to a first resource of a multi-level computing platform; (ii) predicting, based on a combination of the first workload metric and predetermined criteria, a scaling action with respect to the first resource; (iii) inserting a predictive metric, into a runtime-modifiable rule set, based on the scaling action, with respect to the first resource; (iv) generating a scaling plan, based on a combination of the scaling action and the runtime-modifiable rule set, with respect to the first resource; (v) sending the scaling plan to a level of the multi-level computing platform associated with the first resource; and (vi) triggering, based on the runtime-modifiable rule set, implementation of the scaling plan.

DETAILED DESCRIPTION

In some embodiments of the present invention, a cloud configuration, including public and private clouds, is organized hierarchically, with a top level and any number of lower levels. A parent level cloud receives resource workload metrics from respective child level cloud(s), makes predictions as to future resource needs at the child level, and sets up runtime-modifiable business rules and scaling plans based on the predictions. The parent level cloud sends the scaling plans to respective child level(s). The parent level automatically triggers a scaling plan at a child level, if conditions written into the business rules are satisfied. Resources are scaled upward or downward automatically as needed to maintain optimal resource usage.

This Detailed Description section is divided into the following sub-sections: (i) The Hardware and Software Environment; (ii) Example Embodiment; (iii) Further Comments and/or Embodiments; and (iv) Definitions.

I. THE HARDWARE AND SOFTWARE ENVIRONMENT

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
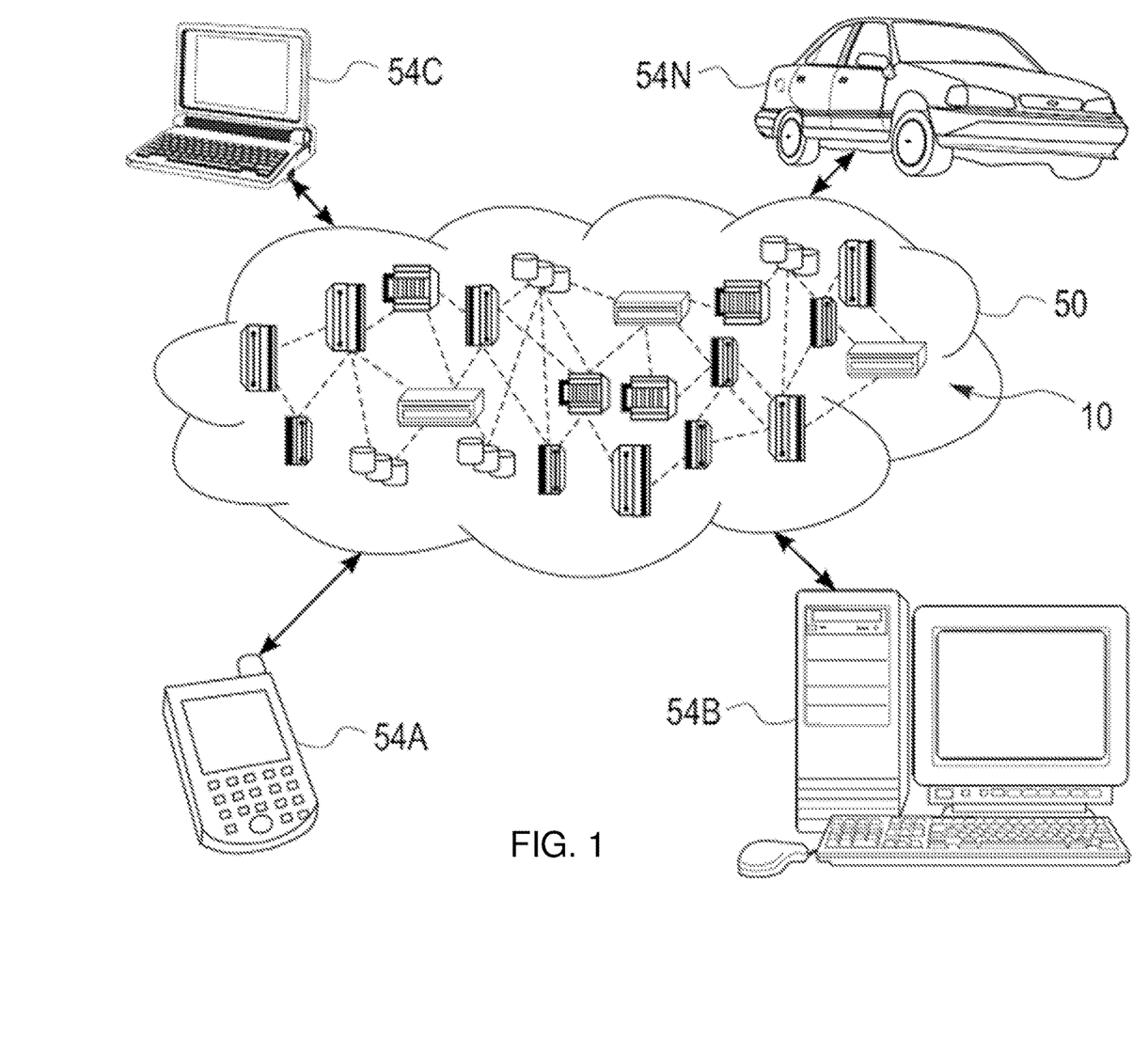
FIG. 1 depicts a cloud computing environment in accordance with at least one embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
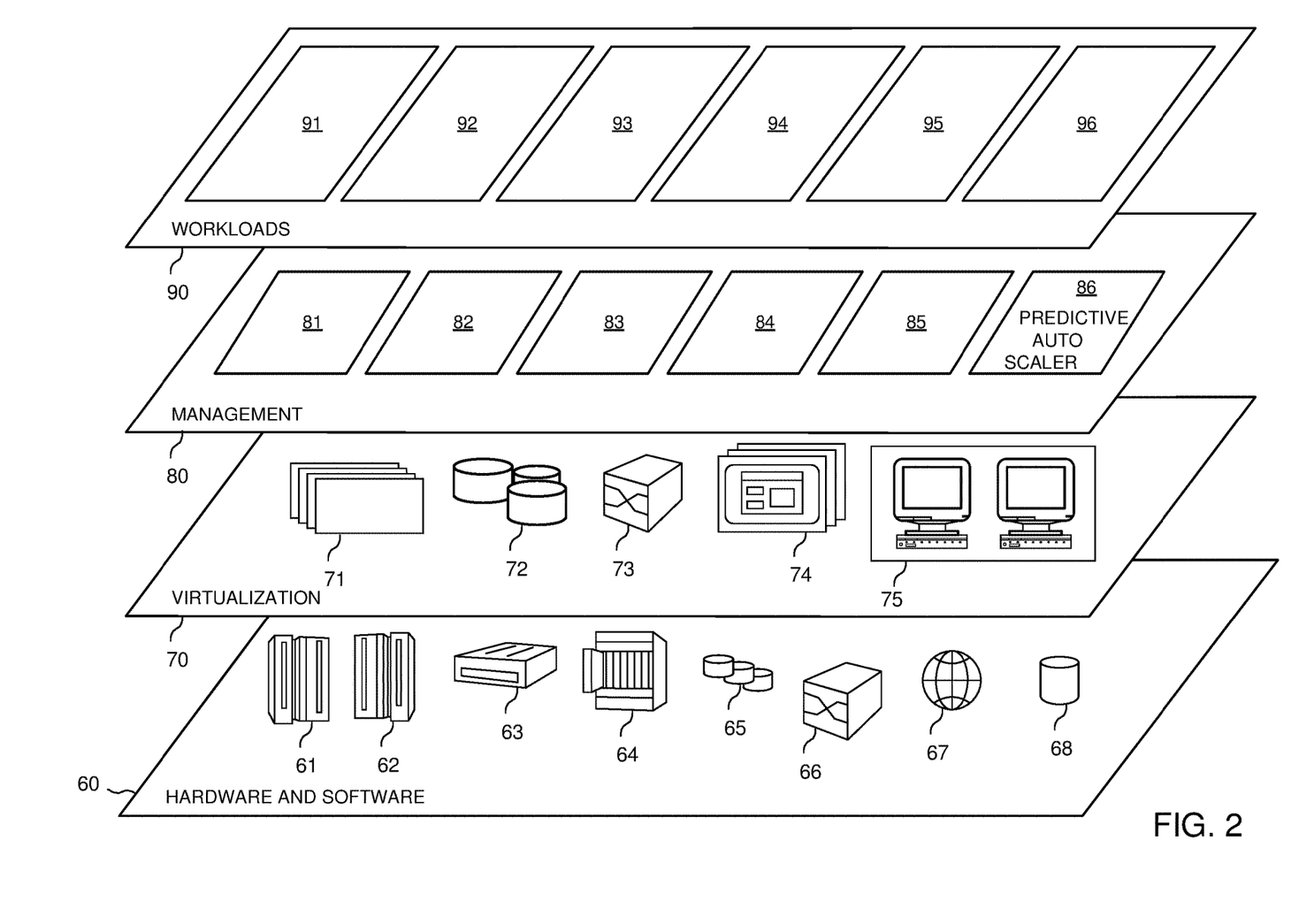
FIG. 2 depicts abstraction model layers in accordance with at least one embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA. Predictive auto scaler 86 automatically keeps track of resource usage at various levels of a hybrid, hierarchical cloud computing platform, and causes scaling (scaling up or scaling down) of the resources in response to dynamically changing workload conditions.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; and transaction processing 95.

Figure 3:
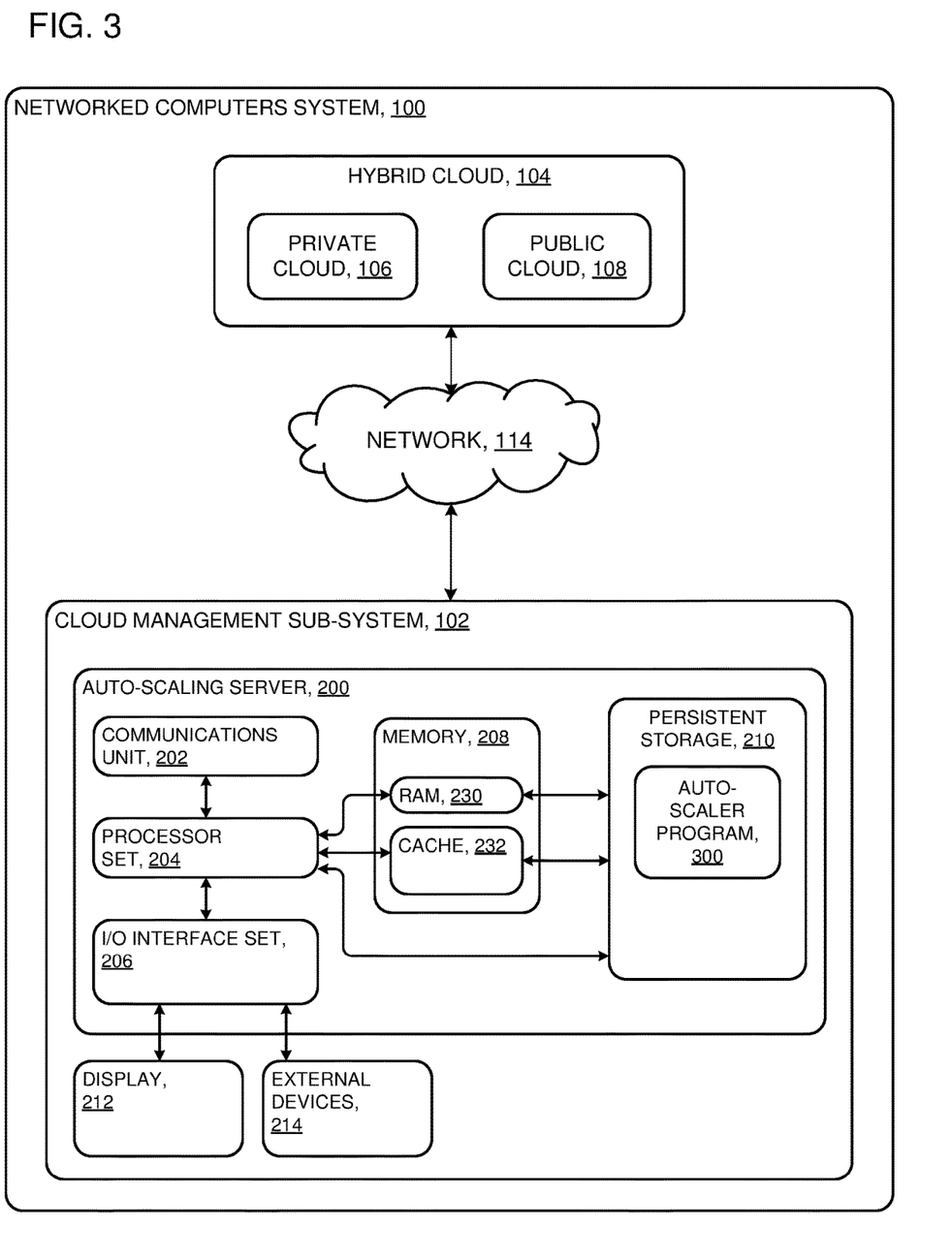
FIG. 3 is a block diagram of a system in accordance with at least one embodiment of the present invention.

An embodiment of a possible hardware and software environment for software and/or methods according to the present invention will now be described in detail with reference to the Figures. FIG. 3 is a functional block diagram illustrating various portions of networked computers system 100, including: cloud management sub-system 102; hybrid cloud 104; private cloud 106; public cloud 108; communication network 114; auto-scaling server 200; communications unit 202; processor set 204; input/output (I/O) interface set 206; memory 208; persistent storage 210; display 212; external devices 214; random access memory (RAM) 230; cache 232; and auto-scaler program 300.

Cloud management sub-system 102 is, in many respects, representative of the various computer sub-system(s) in the present invention. Accordingly, several portions of cloud management sub-system 102 will now be discussed in the following paragraphs.

Cloud management sub-system 102 may be a laptop computer, tablet computer, netbook computer, personal computer (PC), a desktop computer, a personal digital assistant (PDA), a smart phone, or any programmable electronic device capable of communicating with the client sub-systems via communication network 114. Auto-scaler program 300 is a collection of machine readable instructions and/or data that is used to create, manage, and control certain software functions that will be discussed in detail, below, in the Example Embodiment subsection of this Detailed Description section.

Cloud management sub-system 102 is capable of communicating with other computer sub-systems via communication network 114. Communication network 114 can be, for example, a local area network (LAN), a wide area network (WAN) such as the Internet, or a combination of the two, and can include wired, wireless, or fiber optic connections. In general, communication network 114 can be any combination of connections and protocols that will support communications between server and client sub-systems.

Cloud management sub-system 102 is shown as a block diagram with many double arrows. These double arrows (no separate reference numerals) represent a communications fabric, which provides communications between various components of cloud management sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external devices 214 may be able to supply, some or all, memory for cloud management sub-system 102; and/or (ii) devices external to cloud management sub-system 102 may be able to provide memory for cloud management sub-system 102.

Auto-scaler program 300 is stored in persistent storage 210 for access and/or execution by one or more of the respective computer processor set 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Auto-scaler program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to cloud management sub-system 102. In these examples, communications unit 202 includes one or more network interface cards.

Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with auto-scaling server 200. For example, I/O interface set 206 provides a connection to external devices 214. External devices 214 will typically include devices such as a keyboard, keypad, a touch screen, and/or some other suitable input device. External devices 214 can also include portable computer-readable storage media such as, for example, thumb drives, portable optical or magnetic disks, and memory cards. Software and data used to practice embodiments of the present invention, for example, auto-scaler program 300, can be stored on such portable computer-readable storage media. In these embodiments, the relevant software may (or may not) be loaded, in whole or in part, onto persistent storage 210 via I/O interface set 206. I/O interface set 206 also connects in data communication with display 212.

Display 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature, herein, is used merely for convenience, and, thus, the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. EXAMPLE EMBODIMENT

Figure 4:
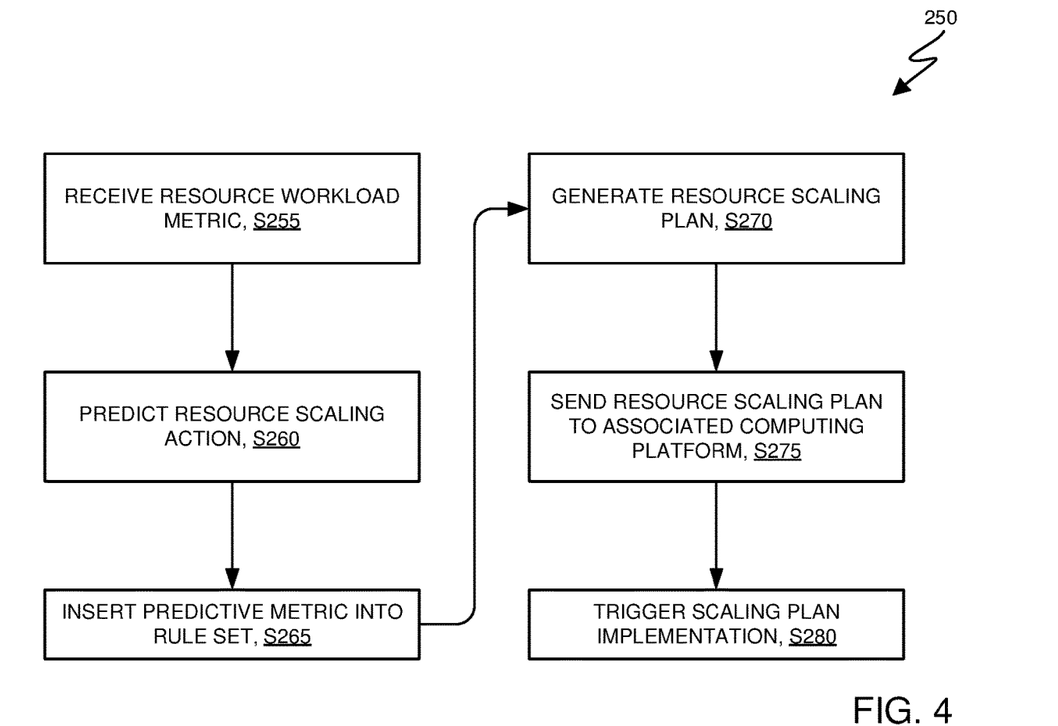
FIG. 4 is a flowchart showing a method performed in accordance with at least one embodiment of the present invention.
Figure 5:
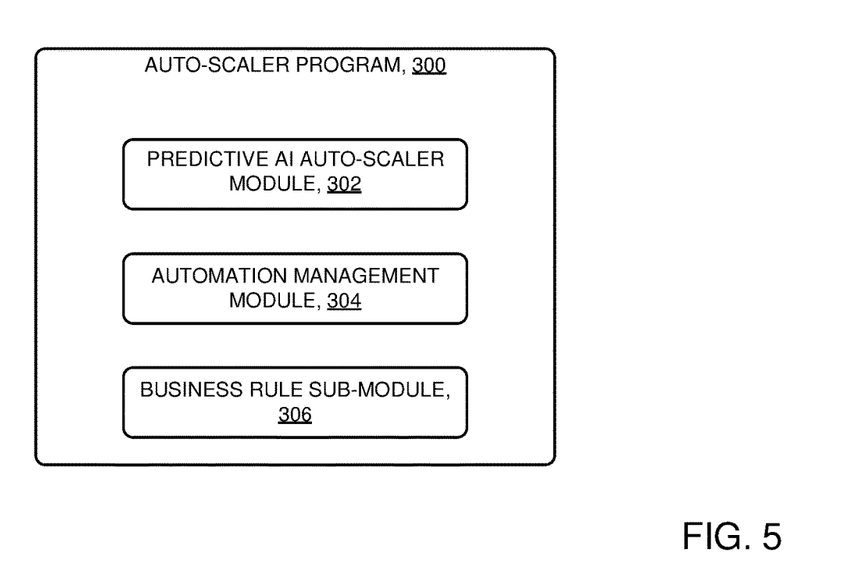
FIG. 5 is a block diagram showing a machine logic (for example, software) portion of a system in accordance with at least one embodiment of the present invention.

FIG. 4 shows flowchart 250 depicting a method according to the present invention. FIG. 5 shows auto-scaler program 300 for performing at least some of the method operations of flowchart 250. This method and associated software will now be discussed, over the course of the following paragraphs, with extensive reference to FIG. 4 (for the method operation blocks) and FIG. 5 (for the software blocks). One physical location where auto-scaler program 300 of FIG. 5 may be stored is persistent storage 210 (see FIG. 3).

Processing begins at operation 5255, where predictive AI auto-scaler module 302, of auto-scaler program 300, receives workload metrics with respect to resources operating on given level of a hierarchical computing platform. In some embodiments, the workload metrics correspond to such things as processor utilization, memory usage, storage usage, network bandwidth usage, arrival rates, interarrival times, response times, throughput, and/or service load patterns, etc.

Processing proceeds at operation 5260, where predictive AI auto-scaler module 302, of auto-scaler program 300, predicts a scaling action with respect to the given level of the computing platform. The predicted scaling action may involve such things as increasing or decreasing storage space, memory, or other resources allocated to a process running on the given level of the computing platform. In some embodiments, predictive AI auto-scaler module 302 predicts the scaling action based on past performance experience such as (without limitation) workload variations observed with respect to the time of day, day of week, or product life cycle for an application type running on the given level of the computing platform, etc.

Processing proceeds at operation 5265, where business rule module 306, of auto-scaler program 300, generates a set of business rules based, at least in part, on the predicted scaling action. An example of a business rule set is given below, under the sub-heading "Example business rule" in the Further Comments and/or Embodiments subsection of this Detailed Description section.

Processing proceeds at operation 5270, where predictive AI auto-scaler module 302, of auto-scaler program 300, generates a scaling plan based on the predicted scaling action determined above at operation 5260. The scaling plan comprises a detailed set of actions to be taken in the event the scaling plan is put into practice (triggered).

Processing proceeds at operation 5275, where automation management module 304, of auto-scaler program 300, sends the scaling plan to the given level of the computing platform, where the scaling plan is held at readiness, awaiting a signal that triggers activation of the plan.

Processing proceeds at operation 5280, where automation management module 304, of auto-scaler program 300 determines to trigger the scaling plan, and consequently sends a signal to the given level of the computing platform that triggers implementation of the scaling plan.

III. FURTHER COMMENTS AND/OR EMBODIMENTS

Some embodiments of the present invention may recognize one, or more, of the following facts, potential problems, and/or potential areas for improvement with respect to the current state of the art conventional auto-scalers: (i) may be able only to scale resources that are deployed on a provider's platform; (ii) may have difficulty optimizing individual metrics in each of the clouds, as well as overall end-to-end and quality of service (QoS) metrics, in a hybrid cloud deployment; (iii) may have difficulty reacting to infrastructure changes on multiple cloud platforms, in addition to configuration changes specific to certain resources and applications; (iv) focus on adapting a single cloud provider (as opposed to large-scale hybrid clouds with multiple cloud providers); and/or (v) require constant monitoring of system metrics, and react to changes thereof, at runtime.

Some embodiments of the present invention may include one, or more, of the following features, characteristics, and/or advantages: (i) a business rule engine (BRE) implements auto-scaling decisions in an easier way for a cloud operator; (ii) an artificial intelligence (AI) predictive model predicts future scaling needs, and communicates the future scaling needs to the BRE; and/or (iii) an automation manager (sometimes herein referred to as a "cloud automation manager") works in conjunction with the BRE, and uses infrastructure as code (IaC) templates to efficiently scale hybrid cloud services.

In some embodiments, an auto-scaler uses a BRE to allow for simple yet sophisticated rules to make scaling decisions in a hybrid cloud platform. The use of business rules simplifies the auto-scaling requirements, and makes it easier for a cloud operator to understand and implement the auto-scaling requirements. The cloud operator can easily write a set of simple rules to make scaling decisions based on different system performance and/or workload metrics for different services in a hybrid cloud environment. Examples of system performance and/or workload metrics include CPU utilization, memory usage, storage usage, network bandwidth usage, arrival rates, interarrival times, response times, throughput, and/or service load patterns, etc.

It is to be understood that while some embodiments of the present invention are directed to hybrid cloud environments comprising private and public cloud platforms in a hierarchical structure, some embodiments are directed to non-hybrid public or private cloud infrastructures, and other networked computing platforms, including non-cloud platforms and/or other hierarchical computing platforms.

In some embodiments, an AI predictive model, based on historical system data, predicts future changes in service workload and the cloud platform. The AI predictive model communicates needs for additional scaling to support the future changes, to the BRE. Embodiments organize the BRE and AI model in a hierarchy, wherein: (i) deployments located on individual clouds each maintain local performance metrics; and (ii) a deployment at a higher level manages all the individual clouds, whether public clouds or private, and maintains end-to-end metrics and cost optimization.

In some embodiments, a cloud automation manager uses "infrastructure as code" (IaC) templates to apply scaling decisions (or predicted scaling actions) for deploying additional (or releasing surplus) resources in the hybrid cloud platform. The cloud automation manager automates and simplifies the deployment or release of different types of resources for multiple services in public cloud platforms as well as private cloud platforms inside a hybrid cloud environment.

Figure 6:
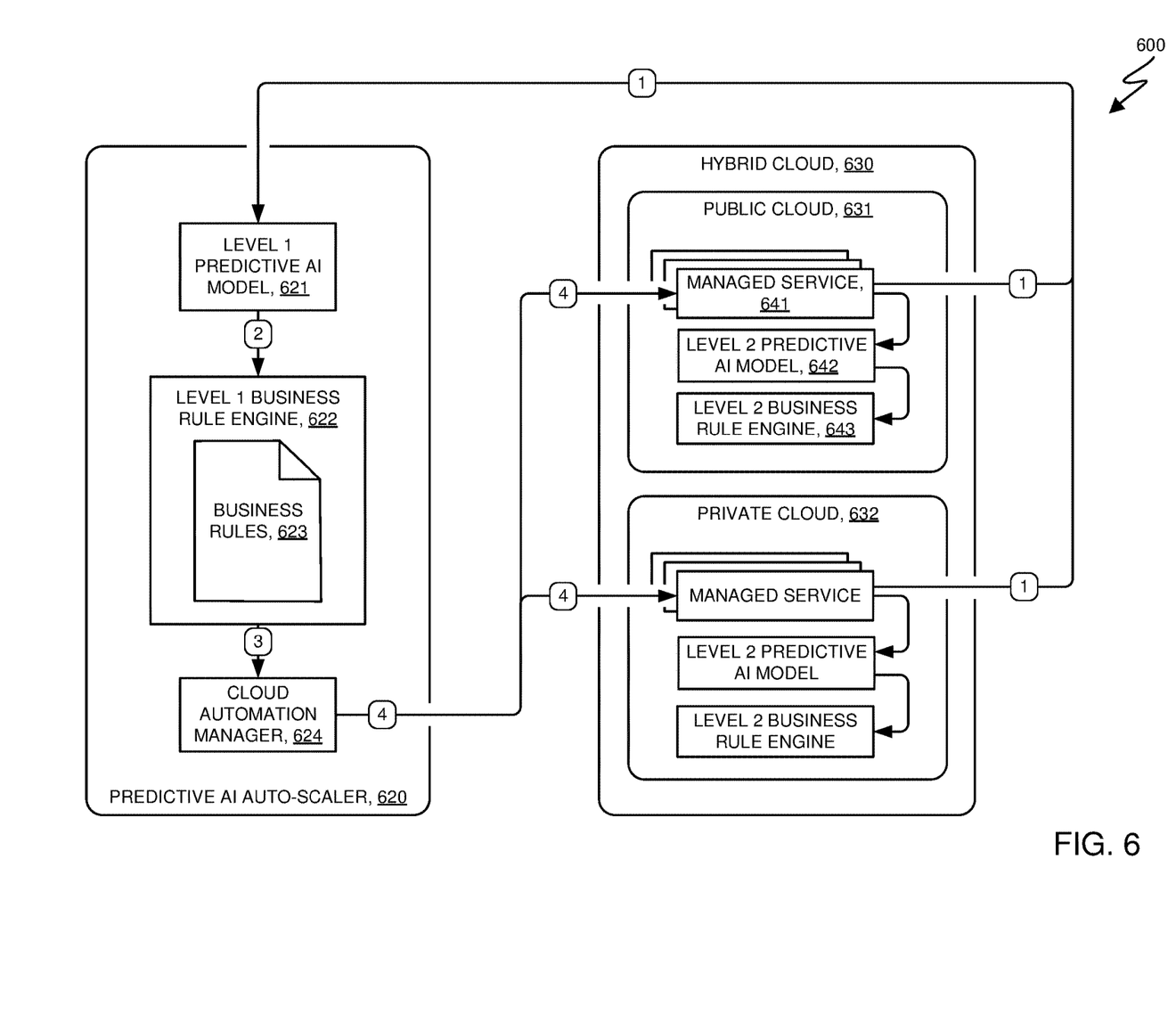
FIG. 6 is a block diagram showing a predictive artificial intelligence hybrid cloud auto-scaler architecture in accordance with at least one embodiment of the present invention.

Block diagram 600 of FIG. 6 shows a process and system architecture, in accordance with some embodiments of the present invention, including: predictive artificial (AI) auto-scaler 620; level 1 predictive AI model 621; level 1 business rule engine (level 1 BRE 622); business rules 623; hybrid cloud 630; public cloud 631; private cloud 632; managed service 641; level 2 predictive AI model 642; and level 2 business rule engine 643. Hybrid cloud 630 may comprise any number of instances of public cloud 631 and any number of instances of private cloud 632. Each of public cloud 631 and each private cloud 632, may comprise any number of managed service 641.

In some embodiments, a predictive AI auto-scaler is hierarchical and distributed, wherein: (i) an auto-scaler (not shown), associated with each cloud level (for example hybrid cloud 631 comprising public cloud 631 and private cloud 632), maintains metrics local to the associated cloud level; and (ii) predictive AI auto-scaler 620 (at a higher cloud level in the cloud hierarchy) maintains overall hybrid cloud 630 optimization. Cloud automation manager 624 (sometimes herein referred to as a cloud automation manager) manages and deploys services (for example, any number of instances of managed service 641) on both public cloud 631, and private cloud 632. Level 1 predictive AI model 621, of predictive AI auto-scaler 620, receives metrics streamed from the instances of managed service 641.

Level 1 predictive AI model 621 analyzes different types of workload mixes to make intelligent and predictive scaling decisions. Based on the streamed metrics input data, level 1 predictive AI model 621 makes a scaling decision and generates a predictive metric with respect to a future time, and inserts the predictive metric into an existing business rule on which to base scaling of one or more instances of managed service 641 in hybrid cloud 630. Alternatively, in some embodiments, AI model 621 generates a predictive metric and inserts the predictive metric into an existing business rule at a future time, based on the nature of the predictive metric and/or conditions on which the metric is determined.

Business rules can be changed and modified during runtime. Stateful properties of level 1 BRE 622 allow for historical and temporal analysis. For predictive scaling, level 1 predictive AI model 621 writes (generates) a series of business rules, where certain changes in workload conditions trigger one or more corresponding business rules in response. This allows level 1 predictive AI model 621 to predict, and implement, preemptive scaling changes in support of predicted future scaling needs. In addition to modifying business rules by level 1 predictive AI model 621, a cloud operator may directly modify business rules 623 to accommodate current and future scaling needs.

In some embodiments, predictive AI auto-scaler 620 operates at the highest level of the cloud hierarchy. AI auto-scaler 620 comprises: level 1 predictive AI model 621, level 1 BRE 622, and cloud automation manager 624. Level 1 predictive AI model 621 receives metrics streamed from hybrid cloud 630, and more particularly, from public cloud 631 and private cloud 632 (arrows "1"). Level 1 predictive AI model 621 modifies auto-scaling rules and passes the rules on to level 1 BRE 622 (arrow "2"). Level 1 BRE 622 develops one or more plans (such as a scaling plan), with respect to configuration changes for hybrid cloud 630, in response to a combination of the modified auto-scaling rules and business rules 623. Level 1 BRE 622 passes the one or more (cloud configuration change) plans to cloud automation manager 624 to initiate implementation of the plans (arrow "3"). Cloud automation manager 624 applies the plans by passing the plans to managed services (such as managed service 641) associated with public cloud 631 and/or private cloud 632 (arrows "4").

At lower levels, for example level 2 at public cloud 631, the level 2 auto-scaler comprises level 2 predictive AI model 642, and level 2 business rule engine 643. The level 2 auto-scaler maintains local metrics such as CPU utilization thresholds, and streams the local metrics to level 1 predictive AI model 621 of predictive AI auto-scaler 620 as previously discussed above in the previous paragraph, completing a continuous feedback and control loop with objectives that include maintaining overall quality of service (QoS) objectives of hybrid cloud 630.

In some embodiments of the present invention, a set of business rules comprise a set of conditional and consequential "when-then" rules, meaning when a condition occurs, then perform a consequence or action. A business rule engine (BRE 622 for instance) manages and executes business rules in a runtime environment. The business rule engine continuously fires the rule every x seconds (where, in some embodiments, x is a user-selected time value). The business rule engine collects performance metrics from the services and/or predictive AI model, and then uses those metrics to make autoscaling decisions.

Example Business Rule.

A set of high level example business rules, expressed in pseudocode, for scaling a set of services when the conditions of the rules are satisfied, now follows.

Business Rule 1: Prepare Scale-Up Timer

When CPU>40% and no state exists in BRE memory

Then

Insert "ScaleUp" state

Business Rule 1 determines whether average CPU utilization of the services exceeds a threshold. In the present example case, the threshold is 40%. CPU utilization is an average measure of services, collected over a user-selected time period (for example, the last 30 seconds). The rule then inserts a "ScaleUp" state to begin the scaling process.

Business Rule 2: Prepare Scale Up

When CPU>40% after 30 seconds in "ScaleUp" state

Then

Update "ScaleUp" state to "start scaling"

After an additional 30 seconds (while in "ScaleUp" state) have passed, business rule 2 determines whether the CPU utilization continues to exceed the threshold (40% in this case). This additional 30 second time period prevents unnecessary scaling actions in response to utilization outliers or spikes. If utilization continues to exceed 40% (the condition is satisfied), the rule changes the state value from "ScaleUp" to "start scaling". In some embodiments, utilization over any given time period is measured in various ways such as (i) an average utilization over the time period; (ii) utilization remaining above the threshold during the entire time period; (iii) utilization remaining over the threshold for a specified percentage of the time period; and/or (iv) any other method, numerical, arithmetic, statistical or otherwise, deemed suitable for a given implementation.

Business Rule 3: Scale Up

```
When "ScaleUp" state value = "Completed"
Then
Increase instance count
Plan and apply to CAM
```

Business Rule 3 determines whether the "ScaleUp" state exists and whether its value is "completed". If "ScaleUp" state="completed", (the conditions are satisfied), the rule calls the cloud automation manager (CAM) to deploy the new instance for scaling.

The following example code shows coding, written in Drools (an open-source business rule engine developed by RedHat), corresponding to the pseudocode example given above. (Note: the terms "Drools" and/or "RedHat" may be subject to trademark rights in various jurisdictions throughout the world and are used here only in reference to the products or services properly denominated by the marks to the extent that such trademark rights may exist.)

Business Rule 1: Prepare Scale Up Timer

```
When
    //Checks if CPU Average is over 40% and Scale up State does
    not exist
        metric: Metric (metric.getCpuAverage > 40)
        not State( name == "ScaleUp" )
    Then
    //Inserts ScaleUp State into the Rule Engine Memory
        State state = new State( );
        state.setName("ScaleUp");
        state.setState(State.NOTRUN);
        insert(state);
    end
```

Business rule 1 checks the "Metric" object which comprises performance metrics of the service, in this case, CPU average utilization. Once the rule is satisfied, the BRE initializes the "State" object (State.NOTRUN, a binary value).

Business Rule 2: Prepare for Scale Up

```
When
    //Checks if CPU Average is still over 40% after 30 seconds
        metric: Metric (metric.getCpuAverage ( ) > 40)
        state : State (name == "ScaleUp" && state == State.NOTRUN,
        this before [30s] metric)
    then
    //Value of State is changed and updated in memory to begin
    Scaling Up
        state.setState (State.FINISHED) ;
        update (state) ;
    end
```

Business rule 2 uses temporal (time-related) properties. In the "when" statement, "this" represents the state, and "before [30s] metric" determines if the state has existed for more than 30 seconds before the current Metric object. If the condition is satisfied, the BRE updates the binary value of the state to State.FINISHED, in the BRE memory.

Business Rule 3: Scale Up

```
when
    //Checks if ScaleUp state exists in memory and is
    completed, i.e. from the previous rule.
        camJson : CamJson ( )
        state : State (name == "ScaleUp" && state ==
    State.FINISHED)
    then
    //Calls CAM API
        CamTemplateAPI cc = new CamTemplateAPI ("nnn.nnn.nnn.nnn") ;
    //Get current number of resources deployed
        int value = camJson.getNumericalValue ("acme.json",
    "web_replica") ;
    //Increases the current resource count by one
        camJson.changeValue ( "acme.json ", "web_replica ", " " + (value
    + 1) ) ;
    //Plan the deployment by sending API request to Cloud
    Automation Manager
        CamJson ModifyJson = new CamJson ( ) ;
        cc.ModifyInstance ("acme.json")
    //Deploy the resource by sending API request to Cloud
    Automation Manager
        cc.ApplyInstance ( )
        retract (state)
        update (camJson) ;
    end
```

In business rule 3, the "when" statement determines whether the "ScaleUp" state has been changed to "State.FINISHED" before proceeding further. "CamJson" comprises current deployment details of associated services on the cloud automation manager. The BRE calls the CAM API through CamTemplateAPI and increases the resource count (web_replica) of our services through a JavaScript Object Notation (JSON) file (acme.json). The BRE next sends the acme.json file through a "plan and apply" request using "ModifyInstance" and ".ApplyInstance", which begins the process of deploying an additional resource on the cloud.

If the CPU utilization value declines to less than 40% after 30 seconds, the BRE removes the State. This process is the same whether "scaling up" or "scaling down". Since the business rules are easy to write and flexible, a user can write rules for different scaling use cases with the predictive AI model and based on CPU utilization and/or other metrics.

Note: In the example code above, "nnn.nnn.nnn.nnn" represents an internet protocol (IP) address.

In some embodiments, a scale-down action is warranted. Consider a transaction processing system that needs a greater amount of memory to handle high-demand periods, and a lesser amount of memory during low-demand periods. When a high-demand period runs its course and demand falls below a threshold level for a pre-defined length of time, the business rules respond in a fashion similar to the scale-up scenario in the example above, but instead scale down the memory allocated to the transaction processing system.

Figure 7:
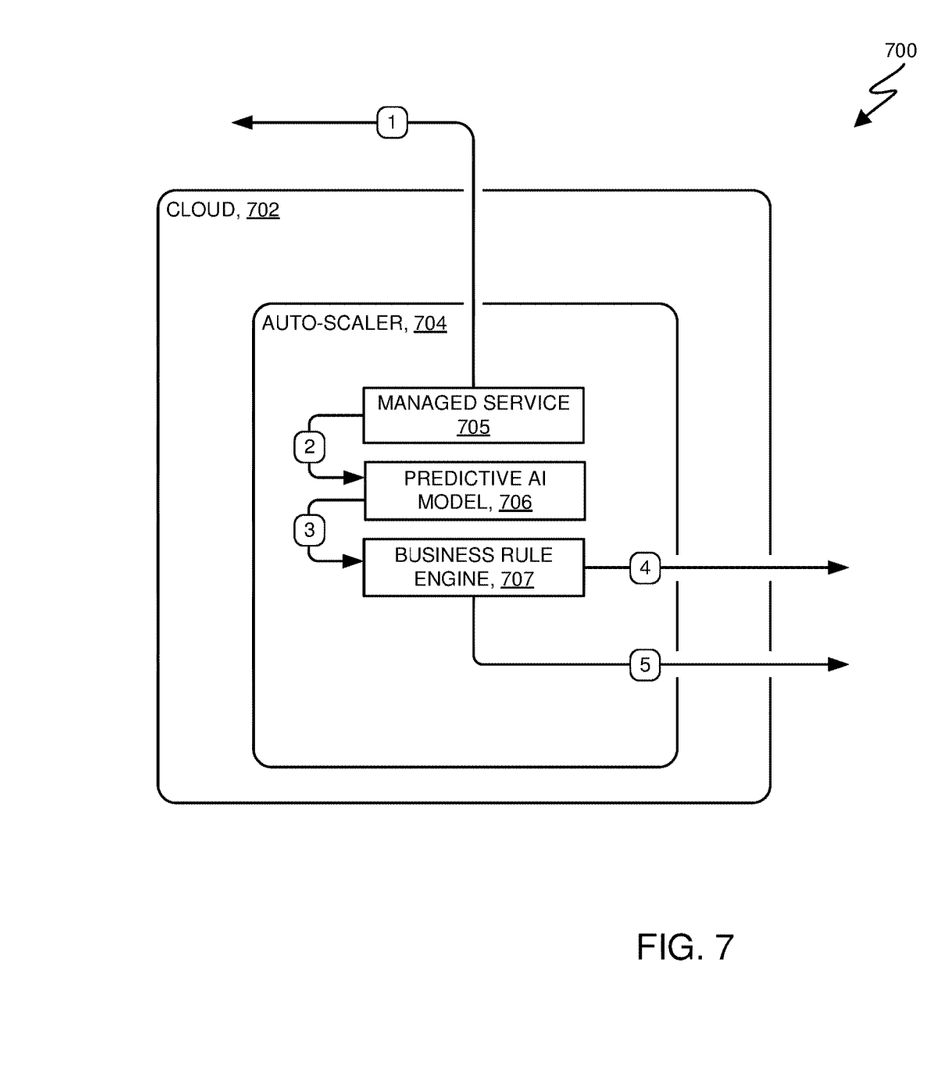
FIG. 7 is a block diagram showing a cloud level process in accordance with at least one embodiment of the present invention.

Block diagram 700, of FIG. 7, shows an auto-scaler process in accordance with some embodiments of the present invention. Auto-scaler 704 comprises predictive artificial intelligence (AI) model 706 and business rules engine (BRE 707) at the cloud level which may be a private or public cloud, or any other networked computing platform. Some embodiments of the present invention comprise a hierarchy of clouds organized in multiple levels, where each individual cloud is associated with a corresponding auto-scaler. With respect to block diagram 700, auto-scaler 704 is associated with mid-level cloud 702, which is situated between a lower level cloud (not shown) and a higher level cloud (not shown).

In some embodiments, a cloud hierarchy comprises, in nested fashion, a level 3 cloud (for example, cloud 702) which may be public or private. Level 3 cloud 702 streams metrics, local to cloud 702, to a level 2 predictive AI model (for example, predictive AI model 642, FIG. 6), which in turn, streams the level 3 metrics, together with level 2 local metrics, to level 1 a predictive AI model (for example, predictive AI model 621, FIG. 6).

Managed service 705 streams (arrow "1") cloud 702 local performance metrics into a predictive AI model auto-scaler (such as level 1 predictive AI model 621, see FIG. 6) of the higher level cloud (not shown), and to predictive AI model 706 (arrow "2"). Predictive AI model 706 predicts scaling decisions based on metrics such as CPU, storage, memory, and network utilization.

Predictive AI model 706 generates (and/or modifies) business rules local to cloud 702 and sends (arrow "3") the generated, or modified business rules to BRE 707. In response to receiving the business rules, BRE 707 changes application-level configuration files and settings in accordance with the business rules to maintain optimal system performance.

BRE 707 sends (arrow "4") application-level configuration changes to a lower level cloud. BRE 707 using an application programming interface (API) provided by the lower level cloud automation manager, initiates (arrow "5"), the scaling changes plan. In some embodiments, the API is coded as a representational state transfer API (REST API).

In some embodiments, a cloud automation manager (CAM, for example cloud automation manager 624 (see FIGS. 6 and 8)) automates service deployments on various cloud providers in an infrastructure as code (IaC) environment. A cloud operator, project team, or automated system, writes a high-level description (IaC script) of deployment details of an application. The CAM executes the IaC script, and automatically deploys the required infrastructure and services based on the IaC script. The CAM defines, provisions, and manages service deployments on public or private clouds. For example, if there is an update to the deployment, or if configuration values change, CAM automates the changes. Once the BRE calls the API, and initializes the new scaling details, CAM applies the changes on the hybrid cloud. This process continuously loops, as performance metrics stream into the auto-scaler.

Figure 8:
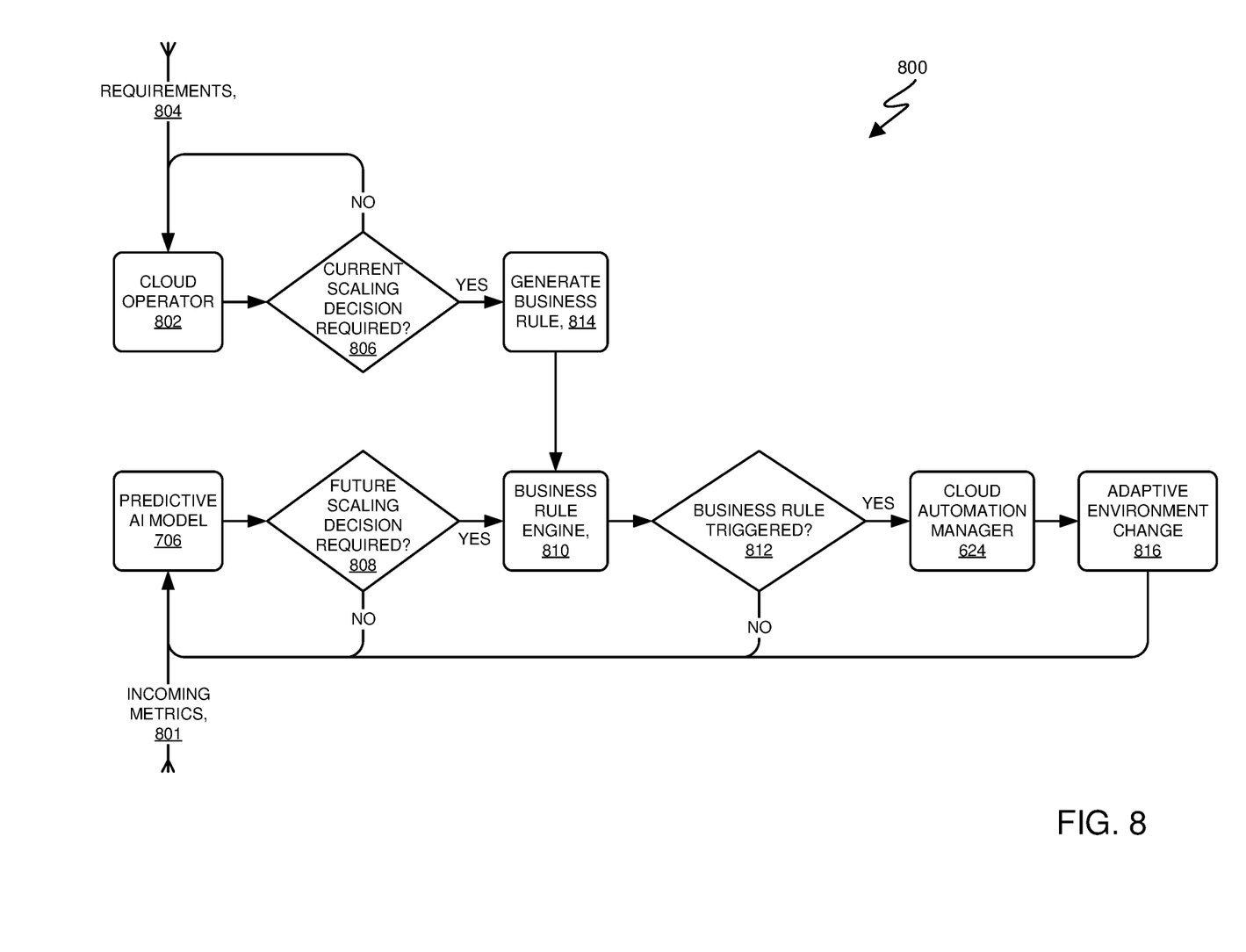
FIG. 8 is a flowchart showing a method performed in accordance with at least one embodiment of the present invention.

FIG. 8 is a hybrid flowchart showing an auto-scaler process, in accordance with some embodiments of the present invention. The auto-scaler process comprises components, information flows, and operations. Components include: predictive AI model 706; cloud operator 802; and cloud automation manager 624. Information flows include: incoming metrics 801; and requirements 804. Operations include: decisions 806, 808, and 812; operation 810 (business rule engine); and operation 816 (adaptive environment change).

Processing begins where predictive AI model 706 analyzes incoming metrics 801 to determine whether a future scaling decision is required. If a future scaling decision is not required (decision 808, "No" branch), processing returns to predictive AI model 706. If a future scaling decision is required (decision 808, "Yes" branch), processing proceeds at operation 810 where predictive AI model 706 generates a predictive metric with respect to a future time, and inserts the predictive metric into an existing business rule, based on a combination of incoming metrics 801 and requirements 804. Moreover, if new requirements necessitate a change in the hybrid cloud environment, cloud operator 802 may generate a business rule to meet the new requirements.

Processing proceeds at decision 812 where, if a business rule is not triggered (decision 812, "No" branch), processing returns to predictive AI model 706. If a business rule is triggered (decision 812, "Yes" branch) cloud automation manager 624 calls a representational state transfer (REST) API to implement the business rule. Processing proceeds at operation 816, where via the REST API, cloud automation manager 624 effects an adaptive environment change.

If services are modified or new services are deployed, their metrics will be streamed into the Predictive AI model to continue the process.

In some embodiments requirements 804 may trigger cloud operator 802 (which may be an automated system, or a human operator) to determine if a current scaling decision is required. If a current scaling decision is not required (decision 806, "No" branch), processing returns to cloud operator 802. If a current scaling decision is required (decision 806, "Yes" branch), predictive AI model 706 generates a predictive metric with respect to a future time, and inserts the predictive metric into an existing business rule (operation 814), based on a combination of incoming metrics 801 and requirements 804. The business rule, including the predictive metric, flows to business rule engine 810. Processing subsequently proceeds at decision 812 as described above.

In some embodiments of the present invention, a computer-implemented process for an artificial intelligence enabled predictive auto-scaler as a service for hybrid cloud deployments, in accordance with some embodiments of the present invention, comprises: (i) in a hybrid cloud platform comprising a set of first auto-scalers at each cloud level maintaining simple local metrics, and a second auto-scaler at a higher level maintaining overall optimization; (ii) receiving a set of metrics from predetermined services streamed into a predictive artificial intelligence model of the second auto-scaler; (iii) analyzing different types of workload mixes in the set of metrics received using predetermined criteria to determine a predictive scaling decision; (iv) generating a business rule using the predictive scaling decision to scale services in a hybrid cloud platform, wherein the rule can be changed and modified during run-time; (v) generating a plan for changes to the hybrid cloud environment; (vi) in response to receiving the plan, applying the plan by managing and deploying services on both public and private clouds inside the hybrid cloud platform by an automation manager; (vii) for each cloud level containing at least one managed service, streaming performance metrics to the second auto-scaler; (viii) receiving performance metrics streamed into a predictive artificial intelligence model of a respective first auto-scaler; (ix) generating a predicted scaling decision using simple metrics including processor utilization and disk usage; (x) generating a local business rule for auto-scaling, wherein the rule can be changed and modified during run-time; (xi) modifying application-level configuration files and settings by a business rules engine; (xii) generating a local plan for changes to the local cloud environment; and (xiii) in response to receiving the local plan, applying the local plan by managing and deploying services on a respective cloud level by an automation manager.

IV. DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Module/Sub-Module: any set of hardware, firmware and/or software that operatively works to do some kind of function, without regard as to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method for automatic resource scaling in a multi-level computing platform, the method comprising:
   receiving a first workload metric for a first resource of a multi-level computing platform;
   predicting, based on the first workload metric, a scaling action for the first resource;
   inserting, based on the predicted scaling action for the first resource, a predictive metric generated with respect to a future point in time into an existing runtime modifiable rule set for triggering an implementation of a scaling plan for the first resource, wherein the predictive metric modifies one or more rules in the existing runtime modifiable rule set for triggering the implementation of the scaling plan;
   generating the scaling plan, based on a combination of the predicted scaling action and the runtime-modifiable rule set;
   sending the scaling plan to a level of the multi-level computing platform associated with the first resource; and
   triggering, based on the runtime-modifiable rule set, implementation of the scaling plan.

2. The method of claim 1, wherein the multi-level computing platform comprises a hybrid cloud platform comprising a plurality of cloud levels structured in a hierarchical manner, where each cloud level is selected from the group consisting of: a private cloud computing platform and a public cloud computing platform.

3. The method of claim 2, further comprising:
   receiving a second workload metric with respect to a second resource of the multi-level computing platform;
   generating a second predicted scaling decision based on the second workload metric;
   generating a run-time modifiable auto-scaling rule set local to a respective level of the multi-level computing platform;
   modifying an application-level configuration file, and an application-level setting;
   generating a local configuration change plan; and
   deploying and managing a service running on the respective level of the multi-level computing platform, based on the local configuration change plan.

4. The method of claim 1 wherein the first workload metric is selected from the group consisting of: processor utilization, memory usage, storage usage, network bandwidth usage, arrival rate, interarrival time, response time, throughput, and service load pattern.

5. The method of claim 1 wherein the first resource is selected from the group consisting of: memory, storage, network bandwidth, and processor utilization.

6. The method of claim 1 wherein triggering implementation of the scaling plan further comprises:
   determining the first workload metric exceeds a threshold value for a pre-defined period of time; and
   in response to determining the first workload metric exceeds the threshold value for the pre-defined period of time, deploying the scaling plan.

7. The method of claim 1 wherein triggering implementation of the scaling plan further comprises:
   determining a threshold value exceeds the first workload metric for a pre-defined period of time; and
   in response to determining the threshold value exceeds the first workload metric for the pre-defined period of time, deploying the scaling plan.

8. A computer program product for automatic resource scaling in a multi-level computing platform, the computer program product comprising:
   one or more non-transitory computer readable storage media, and program instructions collectively stored on the one or more non-transitory computer readable storage media, the program instructions comprising instructions programmed to perform:
   receiving a first workload metric for a first resource of a multi-level computing platform;
   predicting, based on the first workload metric, a scaling action for the first resource;
   inserting, based on the predicted scaling action for the first resource, a predictive metric generated with respect to a future point in time into an existing runtime modifiable rule set for triggering an implementation of a scaling plan for the first resource, wherein the predictive metric modifies one or more rules in the existing runtime modifiable rule set for triggering the implementation of the scaling plan;
   generating the scaling plan, based on a combination of the predicted scaling action and the runtime-modifiable rule set;

sending the scaling plan to a level of the multi-level computing platform associated with the first resource; and triggering, based on the runtime-modifiable rule set, implementation of the scaling plan.

9. The computer program product of claim 8, wherein the multi-level computing platform comprises a hybrid cloud platform comprising a plurality of cloud levels structured in a hierarchical manner, where each cloud level is selected from the group consisting of: a private cloud computing platform and a public cloud computing platform.

10. The computer program product of claim 9, further comprising instructions programmed to perform:
receiving a second workload metric with respect to a second resource of the multi-level computing platform;
generating a second predicted scaling decision based on the second workload metric;
generating a run-time modifiable auto-scaling rule set local to a respective level of the multi-level computing platform;
modifying an application-level configuration file, and an application-level setting;
generating a local configuration change plan; and
deploying and managing a service running on the respective level of the multi-level computing platform, based on the local configuration change plan.

11. The computer program product of claim 8 wherein the first workload metric is selected from the group consisting of: processor utilization, memory usage, storage usage, network bandwidth usage, arrival rate, interarrival time, response time, throughput, and service load pattern.

12. The computer program product of claim 8 wherein the first resource is selected from the group consisting of: memory, storage, network bandwidth, and processor utilization.

13. The computer program product of claim 8 wherein instructions programmed to perform triggering implementation of the scaling plan further comprises instructions programmed to perform:
determining the first workload metric exceeds a threshold value for a pre-defined period of time; and
in response to determining the first workload metric exceeds the threshold value for the pre-defined period of time, deploying the scaling plan.

14. The computer program product of claim 8 wherein instructions programmed to perform triggering implementation of the scaling plan further comprises instructions programmed to perform:
determining a threshold value exceeds the first workload metric for a pre-defined period of time; and
in response to determining the threshold value exceeds the first workload metric for the pre-defined period of time, deploying the scaling plan.

15. A computer system for automatic resource scaling in a multi-level computing platform, the computer system comprising:
one or more computer processors; and
one or more computer readable storage media;
wherein:
the one or more computer processors are structured, located, connected and/or programmed to run program instructions stored on the one or more computer readable storage media; and
the program instructions include instructions programmed to perform:
receiving a first workload metric for a first resource of a multi-level computing platform;
predicting, based on the first workload metric, a scaling action for the first resource;
inserting, based on the predicted scaling action for the first resource, a predictive metric generated with respect to a future point in time into an existing runtime modifiable rule set for triggering an implementation of a scaling plan for the first resource, wherein the predictive metric modifies one or more rules in the existing runtime modifiable rule set for triggering the implementation of the scaling plan;
generating the scaling plan, based on a combination of the predicted scaling action and the runtime-modifiable rule set;
sending the scaling plan to a level of the multi-level computing platform associated with the first resource; and
triggering, based on the runtime-modifiable rule set, implementation of the scaling plan.

16. The computer system of claim 15, wherein the multi-level computing platform comprises a hybrid cloud platform comprising a plurality of cloud levels structured in a hierarchical manner, where each cloud level is selected from the group consisting of: a private cloud computing platform and a public cloud computing platform.

17. The computer system of claim 16, further comprising instructions programmed to perform:
receiving a second workload metric with respect to a second resource of the multi-level computing platform;
generating a second predicted scaling decision based on the second workload metric;
generating a run-time modifiable auto-scaling rule set local to a respective level of the multi-level computing platform;
modifying an application-level configuration file, and an application-level setting;
generating a local configuration change plan; and
deploying and managing a service running on the respective level of the multi-level computing platform, based on the local configuration change plan.

18. The computer system of claim 15 wherein the first workload metric is selected from the group consisting of: processor utilization, memory usage, storage usage, network bandwidth usage, arrival rate, interarrival time, response time, throughput, and service load pattern.

19. The computer system of claim 15 wherein the first resource is selected from the group consisting of: memory, storage, network bandwidth, and processor utilization.

20. The computer system of claim 15 wherein instructions programmed to perform triggering implementation of the scaling plan further comprises instructions programmed to perform:
determining the first workload metric exceeds a threshold value for a pre-defined period of time; and
in response to determining the first workload metric exceeds the threshold value for the pre-defined period of time, deploying the scaling plan.

* * * * *